(12) United States Patent
Pyatigorsky et al.

(10) Patent No.: US 7,933,788 B1
(45) Date of Patent: Apr. 26, 2011

(54) PRE-FUNDED HEALTH INSURANCE

(75) Inventors: Eugene I Pyatigorsky, New York, NY (US); Frank Turner, Charlotte, NC (US); Partha Sen, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 384 days.

(21) Appl. No.: 11/948,596

(22) Filed: Nov. 30, 2007
(Under 37 CFR 1.47)

(51) Int. Cl.
*G06Q 40/00* (2006.01)

(52) U.S. Cl. .......................................................... 705/4

(58) Field of Classification Search .................. 705/4, 35
See application file for complete search history.

(56) References Cited

U.S. PATENT DOCUMENTS

| | | | |
|---|---|---|---|
| 2008/0077450 A1* | 3/2008 | Klippel | 705/4 |
| 2008/0120143 A1* | 5/2008 | Beauregard et al. | 705/4 |
| 2009/0094065 A1* | 4/2009 | Hyde et al. | 705/4 |

OTHER PUBLICATIONS

Principal Financial Group Announces New Arrangement with Dental Health Services; Agreement Benefits Dental Customers in California. (Sep. 7). Business Wire, 1. Business Dateline. (Document ID: 689020351).*

Victor Cohn. (Nov. 12, 1991). Choosing a Health Plan; Consumers Confront Higher Premiums and Bare-Bones Coverage :[Final Edition]. The Washington Post (pre-1997 Fulltext),p. z14. Business Dateline. (Document ID: 74750900).*

* cited by examiner

*Primary Examiner* — Alexander Kalinowski
*Assistant Examiner* — Abhishek Vyas
(74) *Attorney, Agent, or Firm* — Banner & Witcoff, Ltd.; Michael Springs (57) ABSTRACT

An intermediary provides pre-funded health insurance to consumers by receiving and processing consumer information and initiating agreements with consumers and with health care providers to implement pre-funded insurance policies, for example, post-retirement health insurance policies. The intermediary may receive information corresponding to the consumer's age, income, health characteristics, and risk factors, as well as the type of insurance coverage desired. A retirement date and a consumer payment schedule for the health insurance policy may be determined based on the consumer information provided. Upon retirement, the intermediary may then pay insurance premiums to a health insurance provider on behalf of the consumer.

9 Claims, 5 Drawing Sheets

PRE-FUNDED HEALTH INSURANCE

BACKGROUND

The costs of health care in the United States continue to climb, and Americans are living longer than ever before. For many, it has become increasingly difficult to afford adequate health insurance. Individuals aging and nearing retirement often face numerous health risks and an increasing likelihood of expensive medical treatments, without the security of an employer's health insurance plan. Large numbers of Americans have not saved adequately to prepare for medical expenses after retirement, such as increasing prescription drug costs and medical procedures that are growing more expensive each year.

Medicare, a federally-administered health insurance program for seniors covering certain costs associated with hospitalization, medical care, and other related health services, provides a partial solution to the problem of growing medical expenses after retirement. However, many financial projections indicate that Medicare may be insolvent in as little as ten years. Additionally, Medicare does not cover individuals under the age of 65, and even for eligible seniors, Medicare often fails to cover many costly medical expenses. For example, Medicare will generally not cover any medical service or item not deemed by a physician to be absolutely necessary, such as physical examinations, routine dental care, and chiropractic services. Medicare also fails to cover all non-prescription drug costs and covers only a portion of prescription drug costs. Thus, Medicare alone is often an inadequate solution for many working Americans looking toward retirement.

In recent years, several other publicly and privately administered health insurance programs have been created to compensate for some of Medicare's deficiencies. For example, some private insurers now offer 'Medigap' programs to supplement Medicare coverage. However, Medigap insurance premiums are often expensive and may be unaffordable to many seniors. Additionally, Medigap programs typically require an individual to be eligible for and enrolled in Medicare, thus excluding many retirees from participating in Medigap. Another program, Health Saving Accounts (HSAs), are tax advantaged savings plans available to taxpayers to cover current and future medical expenses. However, contribution amounts to HSAs are limited, and HSAs do not actually provide medical coverage. Finally, some companies offer post-retirement medical (PRM) plan benefits to provide medical insurance to long-standing employees after they retire. However, only a fraction of U.S. companies currently have PRM plans, and many of those are in the process of eliminating these plans in the face of rising medical costs.

Accordingly, there remains a need for systems and methods for providing and supporting pre-funded health insurance programs.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

According to one aspect of the present disclosure, an intermediary entity receives and processes consumer information for providing pre-funded health insurance to consumers, and initiates agreements with consumers and with health care providers to implement the pre-funded health insurance program. The intermediary may receive information from a consumer corresponding to the consumer's age, income, health characteristics, and risk factors, as well as the type of insurance coverage desired, such as a post-retirement insurance policy. The intermediary may determine an insurance policy activation date (e.g., consumer retirement date) and a pre-fund payment schedule for the health insurance policy, based on the consumer information provided. As an example, a consumer may make periodic payments to an intermediary for a predefined payment term while still employed, in order to pre-fund a post-retirement health insurance policy. Upon retirement, the intermediary may then pay insurance premiums to the health insurance provider on behalf of the consumer. Additionally, a computer server at the intermediary may calculate a consumer retirement date and payment schedule, store the consumer and insurance provider agreements, record incoming consumer payments, and provide automated process support for the pre-funded health insurance system.

According to another aspect of the present disclosure, an employer may provide a pre-funded health insurance program to its employees, for example, by facilitating enrollment into an intermediary pre-funded insurance program and/or contributing to its employee's pre-fund payments. After leaving an employer, employees may continue with the pre-funded health insurance plans under a new employer, or may individually continue making payments to the intermediary according to their consumer payment schedule.

According to additional aspects of the present disclosure, the pre-funding health insurance agreements both involving the consumer and the provider may be modified or canceled based on changes in the circumstances or financial positions of the parities involved. For example, an individual with an existing consumer payment schedule for pre-funded post-retirement health insurance might receive a salary increase and begin making additional pre-fund payments to the intermediary in order to shorten the payment schedule term. Similarly, other consumers may have options to change retirement dates or payment schedules, make lump sum payments, or change the post-retirement policy coverage levels and features. According to yet another aspect, the pre-funding agreements may permit consumers to withdraw from the program and receive refunds for previous payments.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
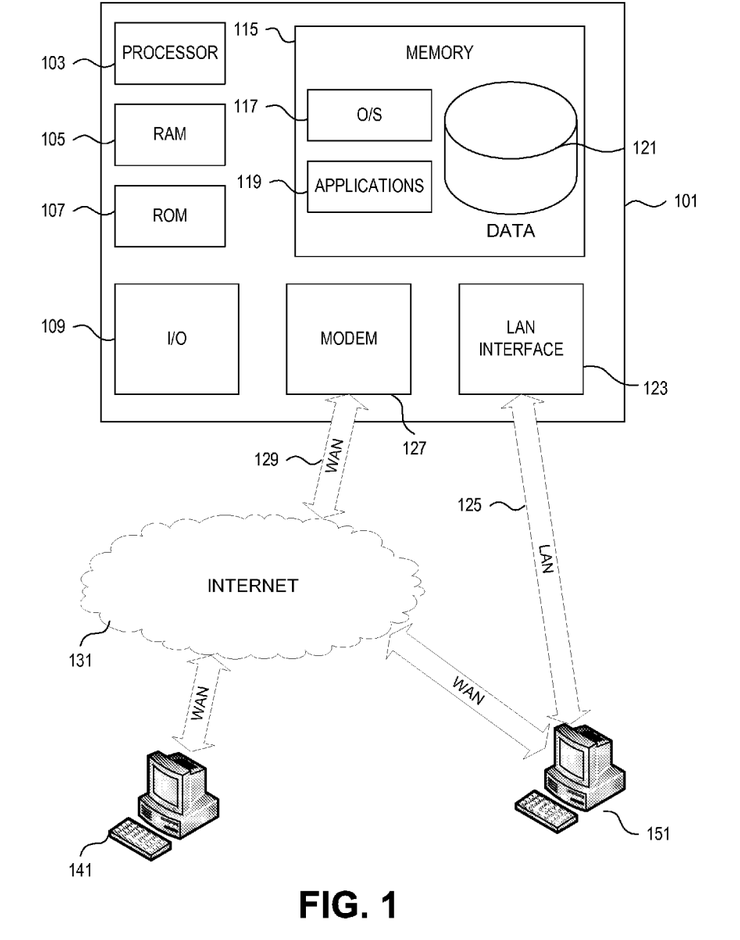
FIG. 1 is a block diagram illustrating a computing device and network, in accordance with at least one aspect of the present invention.

FIG. 1 illustrates a block diagram of a generic computing device 101 (e.g., a computer server) that may be used according to an illustrative embodiment of the invention. The computer server 101 may have a processor 103 for controlling overall operation of the server and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of account information and account holder information for the entire business, allowing interoperability between different elements of the business residing at different physical locations.

The server 110 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are exemplary and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the invention may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Figure 2:
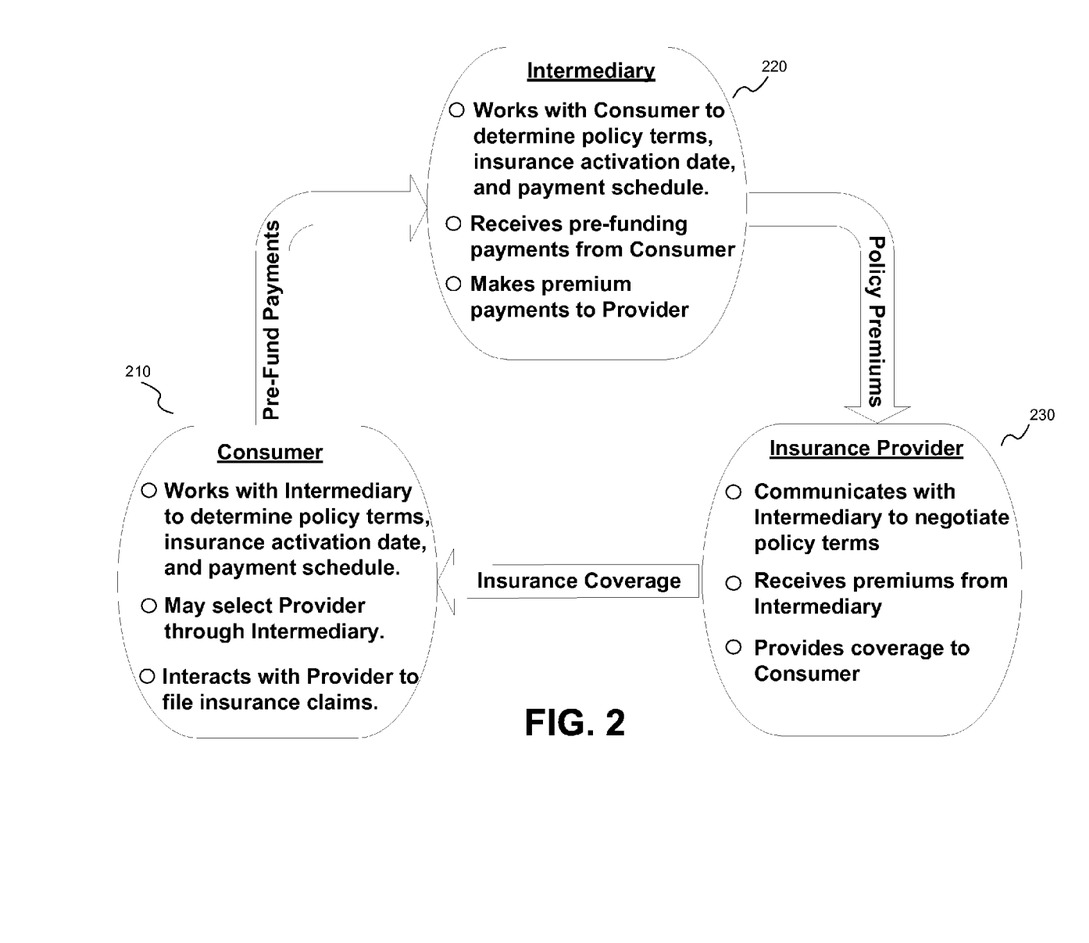
FIG. 2 is a component diagram illustrating multiple entities in a system providing pre-funded health insurance to consumers, in accordance with at least one aspect of the present invention.

Referring to FIG. 2, an illustrative component diagram is shown including a consumer 210, an intermediary entity 220 (e.g., a financial institution), and a health insurance provider 230 in communication in a pre-funded health insurance system. In this example, the consumer 210 may be a working individual in search of a post-retirement health insurance plan. Thus, the consumer 210 may initiate communication with the intermediary 220 while considering the purchase of a pre-funded post-retirement health insurance policy being offered by the intermediary 220. The consumer 210 may provide the intermediary 220 with relevant applicant information and preferences regarding plan/policy criteria and preferences, and the intermediary 220 may use this information to find for the consumer 210 an appropriate post-retirement health insurance policy offered by provider 230.

The intermediary 220 may then calculate a payment schedule for the consumer 210, defining the times and amounts for which the consumer 210 will make the "pre-fund" payments (i.e., payments made prior to the activation of the insurance policy) to the intermediary 220, while the consumer 210 is employed and may be able to more easily afford the payments. When all of the pre-fund payments from the consumer 210 to the intermediary 220 have been made, and the consumer 210 has reached the designated retirement date, the intermediary 220 may begin paying insurance premiums to the insurance provider 230 on behalf of the consumer 210 to provide the agreed upon insurance coverage.

Thus, in this example, the intermediary 220 interacts with the consumer 210 and provider 230 to negotiate the insurance policy terms, retirement date (i.e., activation date), and consumer payment schedule, and then allows the consumer 210 and provider 230 to interact directly once the policy goes into effect. However, in other examples, other configurations of communications between the parties in the system are possible. For example, the functions of the intermediary 220 may be performed directly by the insurance provider 230, such as by a subsidiary or special division within the insurance company 230. In other configurations, the consumer 210 might only interact with the intermediary 220, even when filing insurance claims and receiving reimbursements on the post-retirement policy. In another example, the intermediary 220 might only facilitate the initial communication between the consumer 210 and the selected insurance provider 230. In this example, the consumer 210 and insurance provider 230 may communicate directly to determine a consumer payment schedule, insurance policy terms, and activation date, and the consumer 210 may make the pre-funding payments directly to the insurance provider 230. In yet another example, the intermediary 220 might reach an agreement with a consumer 210 before ever identifying or communicating with any insurance provider 230. Thus, the intermediary 220 may be the initial be the "insurance provider," by agreeing to arrange a health insurance policy as previously determined for the consumer 210 at some point prior to the consumer's retirement date.

Although the above examples relates to post-retirement health insurance, it should be understood that many other varieties of pre-funded insurance are possible. For instance, a consumer 210 may purchase a pre-funded "post-retirement" policy from intermediary 220 to coincide with his spouse's retirement date rather than his/her own, or to coincide with the lapsing of a different insurance policy, etc. Additionally, the techniques for providing pre-funded insurance described herein may be applied to other types of insurance (e.g., home, automobile, life, etc). Moreover, although the examples described often refer to a pre-funded insurance policy, it should be understood that in certain examples, the "pre-fund" payments for a policy might continue beyond the retirement date and the activation date of the policy. For example, as described in detail below, consumer payment schedules may be modified in certain plans based on a change in circumstances of the consumer 210 or the other parties 220-230.

In certain configurations, the consumer 210, intermediary 220, and/or the health care provider 230 may include computer systems comprising devices such as personal computers (PCs), servers, mobile computing devices (e.g., personal data assistants and/or laptop computers) and the like, to store information and manage the operations of their respective component. As an example, a personal computer 101 at a consumer 210 may include an software tool, such as an installed standalone application or an Internet-based application, designed to allow consumers 210 to enter personal information, view and select from different plans supported by different of health insurance providers 230, and communicate with an intermediary server 220 throughout the pre-funded health insurance process. The components 210-230 in the pre-funded health insurance system may be connected to one another via a communication network, which may include a variety of network types, including a telephone network and/or computer network (e.g., LAN, WAN, Internet-based). Each component 210-230 in the pre-funded health insurance system may connect to communication network in multiple possible ways, for example, wired and wireless network protocols (e.g., BLUETOOTH, wireless local area network (WLAN)). Security protocols such as secure sockets layer (SSL), transport layer security (TLS), and/or various encryption techniques may also be established over the network to provide secure communications and protect the data transmitted between the components 210-230.

Figure 3:
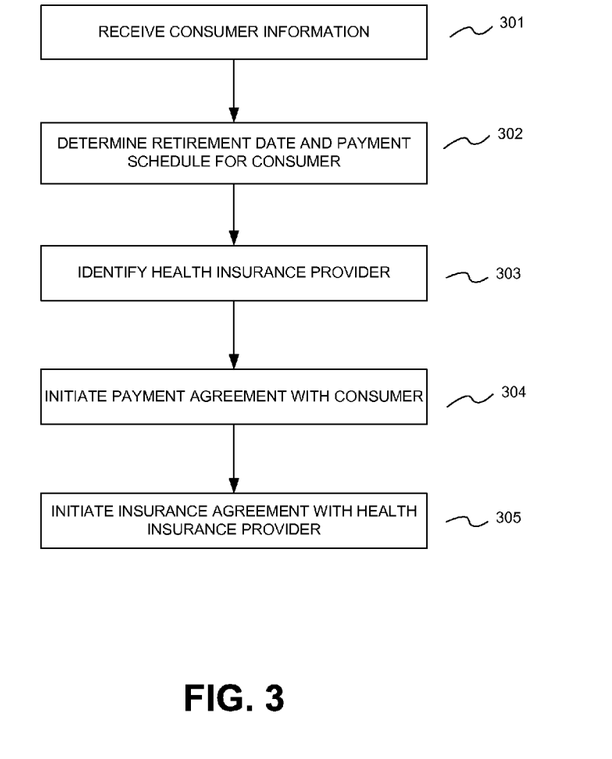
FIG. 3 is a flow diagram showing illustrative steps for initiating agreements to provide pre-funded health insurance to consumers, in accordance with at least one aspect of the present invention.

Referring to FIG. 3, an illustrative flow diagram is shown in which an intermediary 220 initiates agreements with a consumer 210 and a health insurance provider 230 to provide pre-funded health insurance, in accordance with at least one aspect of the present invention. In step 301, the intermediary 220 receives applicant information for a consumer 210 potentially eligible for a pre-funded health insurance plan. In this example, the consumer 210 may be an individual person or group of people (e.g., spouses, family members) interested in purchasing a pre-funded post-retirement health insurance plan. In this step, either the consumer 210 or the intermediary 220 may initiate an application process in which the consumer 210 provides the intermediary 220 with the relevant information for determining the coverage level and terms of the health insurance policy (e.g., current health status, family history, risk factors, provider preference, desired coverage level, and other actuarial data), and the relevant information for determining the consumer payment schedule (e.g., current age, salary, debt profile, anticipated retirement age, etc.).

In step 302, the intermediary 220 determines a potential insurance policy activation date (e.g., the consumer's retirement date) and a consumer payment schedule based on the consumer information received in step 301. The retirement date may be a fixed date provided directly by the consumer 210, or may be calculated for the consumer 210 (e.g., by a processing system including computer server 101 at the intermediary 220) based on the relevant applicant information received in step 301. The consumer payment schedule may comprise a flat dollar amount to be paid monthly to the intermediary 220, and may be calculated based on the received applicant information, the policy price, and calculations regarding the consumer's 210 likely ability to fulfill the payment obligation.

In other examples, step 302 may include a negotiating process or other interactive communication between the consumer 210 and intermediary 220 to select a retirement date and consumer payment schedule acceptable to both parties. For example, the intermediary 220 may present the consumer 210 with a variety of pre-funded policies with different coverage terms and different retirement dates, along with the different corresponding payment schedules. The consumer 210 may then choose from the plans presented or may change certain criteria and preferences, and then ask the intermediary 220 to identify additional plans based on the new criteria and preferences. In certain embodiments, consumer payment schedules may involve other factors and may include optional consumer discounts. For example, certain pre-funded health insurance plans may include payment discounts for consumers 210 for taking proactive health-conscious measures during the pre-funding payment period, such as regular doctor appointments, lowering cholesterol, adopting an exercise regimen, and attending wellness/diet education classes.

In step 303, the intermediary 220 identifies a health insurance provider 230 capable of fulfilling the insurance obligation to the consumer 210. As discussed above, this step may also occur prior to or concurrently with step 302. As also noted above, in certain embodiments the health insurance provider 230 need not be selected at all during this stage of the pre-funded insurance plan. Rather, the intermediary 220 may decide for financial or other reasons not to select a provider and initiate and insurance agreement 230 until some other time prior to the designated consumer retirement date.

When selecting a health insurance provider, certain plans may permit the consumer 210 to directly select a preferred provider 230. In some examples, the intermediary 220 may select the provider 230 for the consumer 210 based on the premium price, coverage level, and the features of the policies offered by different providers, the geographic coverage area for a provider 230 in relation to the consumer's 210 place of residence, and other factors related to the consumer's 210 criteria or preferences. In other examples, multiple providers 230 may bid on pre-funded policy proposals generated by the intermediary 220 for the consumer 210.

In steps 304 and 305, the intermediary 220 has identified a pre-funded health insurance policy and a consumer payment schedule that are satisfactory to the consumer 210, provider 230, and to the intermediary 220. Accordingly, in step 304 a consumer-intermediary agreement is initiated to define the responsibilities of the consumer 210 with respect to the consumer payment schedule and other factors. As noted above, the consumer payment agreement of step 304 may include discounts contingent on the consumer 210 taking proactive health-conscious measures during the payment period. Additionally, as discussed in detail below, the consumer-intermediary agreement may also include terms allowing the consumer 210 and/or intermediary 220 to revise the consumer payment schedule in response to changes to the consumer's circumstances (e.g., employment, salary, health), or other factors affecting the parties' agreements.

In step 305, an intermediary-provider agreement is initiated to set out the obligations of the selected health insurance provider 230 to provide a post-retirement policy for the consumer 210 beginning at the selected retirement date. The intermediary-provider agreement may also define terms for the intermediary 220 pay health insurance premiums to the provider 230 beginning on the same date.

As mentioned above, the intermediary-provider agreement might initially involve only the consumer 210 and the intermediary 220, rather than an actual health insurance provider 230. In this example, the intermediary 220 may act as the provider 230 throughout the length of the pre-funding payment period, and need not create an agreement with an actual health insurance provider 230 until some other time prior to the designated consumer retirement date. Thus, in this example, the intermediary 220 may have an opportunity to speculate advantageously on the health insurance market and/or the actuarial projections regarding the consumer 210.

Figure 4:
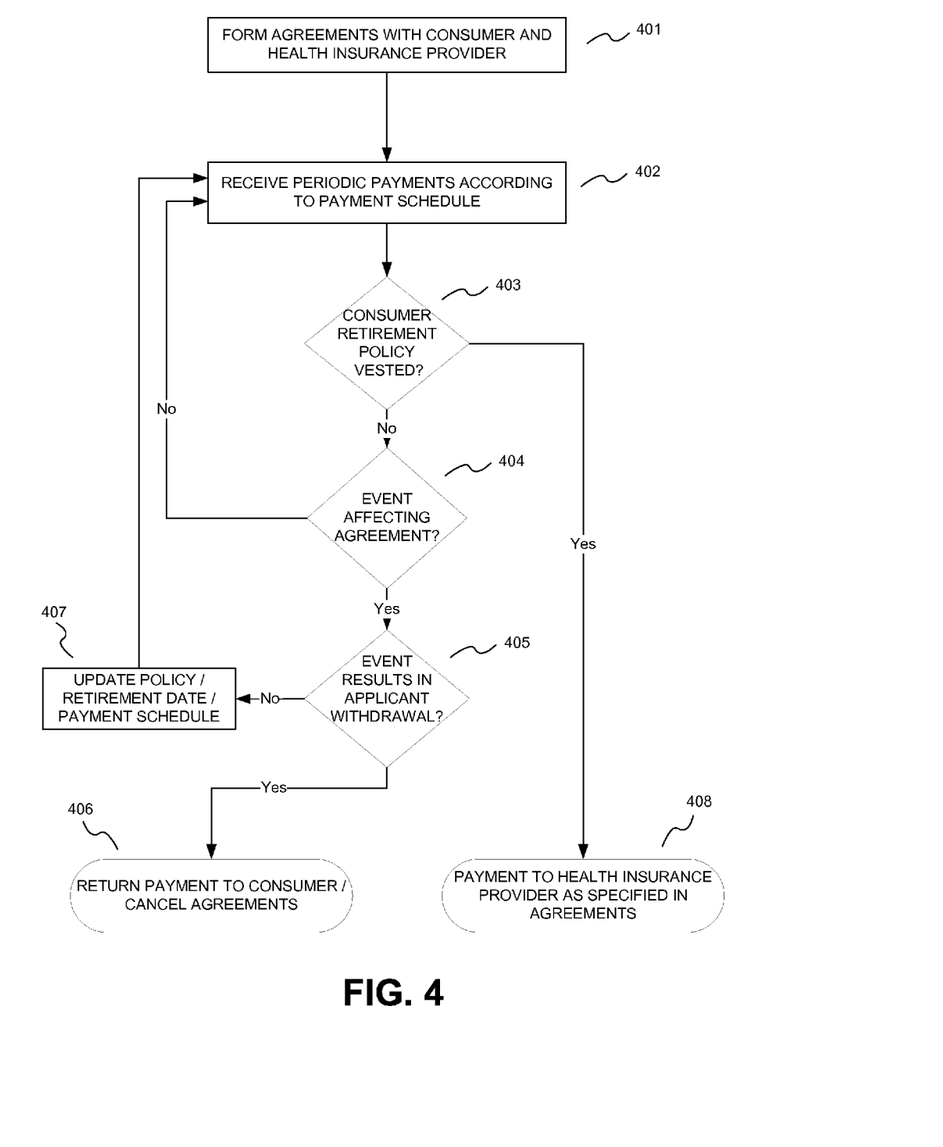
FIG. 4 is a flow diagram showing illustrative steps for implementing and modifying agreements to provide pre-funded health insurance to consumers, in accordance with at least one aspect of the present invention.

Referring to FIG. 4, another illustrative flow diagram is shown for implementing and/or modifying the pre-funded health insurance agreements between the consumer 210, intermediary 220, and health insurance provider 230, in accordance with aspects of the present invention. In step 401, the pre-funded health insurance agreements are formed, for example, a consumer-intermediary agreement and an intermediary-provider agreement defining a pre-funded post-retirement health insurance plan for a consumer 210. Thus, step 401 may correspond to steps 301-305 of FIG. 3, as described above. According to a consumer-intermediary agreement, the consumer 210 may fulfill the designated consumer payment schedule by making periodic pre-funding payments to the intermediary 220. The intermediary 220 may then be responsible for paying the insurance premiums to the provider 230 throughout the lifetime of the post-retirement policy. However, in certain embodiments, the agreements formed in step 401 might include only a single agreement, for example, only the initial consumer-intermediary agreement, or only a direct agreement between the consumer 210 and the health insurance provider 230.

In step 402, consumer payments are received by the intermediary 220 according to the payment schedule defined in the consumer-intermediary agreement. An illustrative payment schedule might specify that the consumer 210 be required to make a $100 payment each month to the intermediary 220 for a term of 15 years. Of course, the amount, frequency, and duration of the consumer payment schedule may depend on the consumer's age, salary, requested health insurance coverage, and other factors. As noted above, the consumer payments may also include verifications of proactive health-conscious measures performed by the consumer 210. Additionally, it should be understood that the consumer payment agreement need not be paid directly by the consumer 210, but may be paid by other party on behalf of the consumer 210, for example, a relative or trust benefiting the consumer 210.

In certain examples, a consumer-intermediary agreement may be facilitated by an employer of the consumer 210. For example, an employer may serve as an intermediary for its employees, or may contract with a separate intermediary financial institution 220, as part of an employee benefit program. In these examples, because the consumer's payment agreement is with the intermediary entity 220 and not with the employer, the consumer-intermediary agreement (and the intermediary-provider agreement) may remain in effect beyond the employee's term of employment. Thus, unlike conventional employer PRM plans, employees can retain and potentially need not even modify their pre-funded health insurance program when changing employers. In some embodiments, an employer may also assist with an employee's pre-funding payment responsibilities, for example, by supporting automatic paycheck deductions to a financial institution intermediary 220. Additionally, a matching incentive program may be implemented, under which an employer contribution is made on behalf of consumer 210, and the amount of the employer's contribution depends on the employee's contribution. In other examples, employers may compensate employees with pre-funding payment contribution increases or lump-sum bonuses paid directly to the intermediary 220. These examples and related embodiments may also imply tax advantages to the employee and the employer, based on the voluntary deductions from employee's take-home salaries used for long-term investment and savings.

After receiving the consumer payment in step 402, the intermediary 220 may evaluate whether the entire consumer pre-payment obligation is satisfied in step 403. This verification may be performed by a processing system, for example, including a computer server 101 at the intermediary 220. The intermediary server 101 may track payments and coordinate the payment schedules of multiple different consumers 210, then store the scheduling and payment data in database 121. In certain embodiments, the intermediary 220 may be a financial institution with an investment infrastructure for saving and managing the collective funds paid by consumers 210, until the funds are paid out to insurance providers as premiums for the consumers' health insurance policies.

If the consumer 210 has satisfied the pre-funding payment obligation (403:Yes), for example, by making all of the periodic payments identified in the consumer payment schedule or by making a preemptive lump-sum payment to the intermediary 220, then the post-retirement policy has vested in the consumer 210 and the process moves to step 408. That is, the consumer 210 is now fully entitled to the benefits of the pre-funded health insurance policy beginning at the designated retirement date. In certain examples, consumers 210 and intermediaries 220 may structure consumer payment schedules so that the 'vest date' of the policy coincides with the retirement date of the consumer 210.

However, if the consumer 210 has not yet fulfilled its entire pre-fund payment obligation (403:No), then in step 404 the intermediary 220 may confirm whether any events have occurred potentially affecting the consumer's ability to pay according to the payment schedule or potentially affecting the consumer's continued participation in the pre-funded insurance plan. An event may be any relevant set of circumstances potentially relating to the consumer's 210 pre-funded insurance plan. For example, an event may comprise a consumer 210 receiving a salary increase, becoming unemployed or changing companies, or otherwise incurring a change to their financial position, encouraging the consumer 210 to revise the payment schedule based on their new financial circumstances. Other events, such as a consumer 210 dying, moving residences to a new area, undergoing a beneficial change in health condition, or requesting a voluntary withdrawal from the pre-funded insurance program might also affect the appropriate payment schedule for the consumer 210 and/or eligibility for remaining in the pre-funded program. In certain examples, consumer-intermediary agreements may permit the voluntary withdrawal of consumers 210 from the pre-funded insurance program, and may allow consumers to receive refunds for some or all of their previous payments.

Additionally, events might relate to the intermediary 220 or the insurance provider 230 and not directly to the consumer 210, but may indirectly affect the consumer agreement. For example, a significant business event (e.g., merger, bankruptcy) affecting the intermediary 220 or provider 230, or a market event affecting the price of health insurance, may constitute events potentially affecting the consumer's plan. In these examples, the obligations of the intermediary 220 may be decreased or annulled as specified in escape clauses written into the initial agreements.

The events described in step 404 may make it appropriate to modify the payment schedule, retirement date, or the insurance policy itself in the consumer's pre-funded program, if such a modification is allowed by the consumer-intermediary agreement and the intermediary-provider agreement. Advantageously, when modifying the payment amounts, frequency, or duration of a consumer payment schedule, it might not be necessary to communicate with the provider 230. That is, the retirement date and all the coverage terms of the health insurance policy may remain unchanged, thus from the provider's perspective the agreement has not been modified. In one such example, when a consumer 210 making monthly pre-fund payments receives a salary increase, the consumer 210 and intermediary 220 may agree to increase the amount of the monthly payments and shorten the payment schedule duration. In other examples, pre-fund payment amounts, frequencies, and durations may be changed, either in accordance with the initial consumer-intermediary agreement or in accordance with a supplemental agreement between the two parties. Additionally, a change in circumstances for a consumer 210 (e.g., an increase or reduction in salary) may result in a modification of the retirement date, or in the level of the coverage in the post-retirement insurance policy.

Other events described in step 404 (e.g., death, voluntary withdrawal request, or prolonged unemployment of the consumer 210) may result in the withdrawal of the consumer 210 from the pre-funded program, and the cancellation of the consumer-intermediary and intermediary-provider agreements. Thus, in step 405, a determination is made whether the event occurring in step 404 can be compensated for with a modification of the consumer's pre-funded program (405: No) in step 407, or whether the event should result in the consumer's withdrawal from pre-funded program (405:Yes) in step 406.

In one example, a consumer 210 making periodic payments to an intermediary 220 as part of a pre-funded insurance program finds an alternative post-retirement insurance provider and requests withdrawal from the pre-funded program. In this example, assuming voluntary withdrawal is allowed under the consumer-intermediary agreement, the intermediary 220 may cancel this agreement and update its records in the intermediary consumer database 115 accordingly. The intermediary 220 may also contact the provider 230 and cancel the corresponding intermediary-provider agreement.

In certain embodiments, the intermediary 220 may refund at least a portion of the consumer's pre-funding payments for the pre-funded program agreements in step 406. A refund determination may be based on several factors, including the total amount of pre-funding payments made by the consumer 210 and the reason for the withdrawal. Depending on the agreement, a refund may be paid back from the intermediary 220 to the consumer 210 as a lump sum payment or as an annuity. In one example, the agreements may specify that if the consumer 210 is no longer alive, a lump sum payment is automatically made to the estate of the consumer 210 and the agreements are immediately terminated. In contrast, if the consumer 210 is alive, the refund may be automatically paid as an annuity, in order to extend to the intermediary-consumer relationship and exploit synergies with the intermediary's 220 other lines of business related to money management.

As an example, a consumer-intermediary agreement may state that in the event of the death of the consumer 210 prior to the vest date of the consumer's insurance policy, a 100% refund is to be granted. In another example, an agreement may include a specified flat monetary fee or percentage based penalty to be incurred by consumers 210 voluntarily withdrawing from pre-funded programs. Withdrawal penalties may also be determined by incorporating corresponding penalties imposed by the provider 203 in connection with canceling the intermediary-provider agreement. If the consumer dies before the policy benefits are disbursed, the accrued value of the payments may be refunded to the consumer's 210 estate, minus a money management fee imposed by the intermediary 220. For voluntary early withdrawal, a withdrawal penalty may take the form of a percentage deduction from the sum of the accumulated payments. In granting refunds for both voluntary and involuntary withdrawal, the consumer may receive appreciation on the accumulated payments, for example, up to a specified "maximum appreciation percentage with penalty" return percentage. In certain examples, involuntary withdrawal may be subject to a maximum appreciation percentage with penalty return rule, while voluntary withdrawal is subject to a lesser appreciation percentage. To illustrate, a maximum appreciation percentage with penalty of 4% may be combined with a 4% penalty for voluntary withdrawal, meaning that 104% of the accrued payments would be returned to a consumer 210 withdrawing involuntarily, while only 100% of the accrued payments would be returned to a consumer 210 withdrawing voluntarily.

In the flow diagram shown in FIG. 4, events are detected and changes are made to the pre-funded insurance plan only after a consumer payment is received in step 402. This time frame may be convenient to detect and respond to certain events, for example, a monthly confirmation that the associated provider 230 still offers insurance coverage to the consumer's updated geographic region. However, in other example, events affecting the consumer's pre-fund program may be detected and acted upon at any time independently of received payments.

If no event has occurred affecting the consumer's pre-funded health insurance program (404:No), or after any necessary changes have been stored by the intermediary 220 in step 407, the consumer 210 will continue to make payments according to the payment schedule until the end of the pre-funding payment term. After the final consumer payment has been made, the consumer's 210 post-retirement insurance policy is vested, and the intermediary 220 may coordinate with the provider 230 so that the insurance premiums on the consumer's policy are paid at the appropriate times in step 408. As discussed above, in certain embodiments, the consumer's pre-funded policy may "vest" before any actual health insurance policy has been purchased by the intermediary 220 on the consumer's behalf. In this example, the intermediary 220 may effectively act as a proxy provider 230 throughout the length of the pre-funding period, and may create an agreement with an actual health insurance provider 230 at some later point prior to the consumer retirement date.

Figure 5:
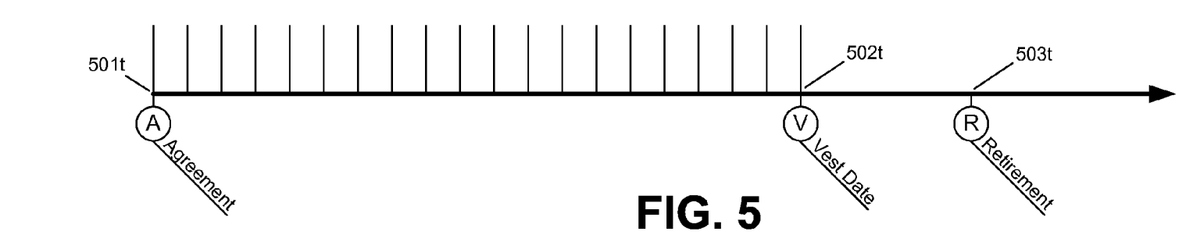
FIGS. 5-7 are example timeline diagrams illustrating the implementation of pre-funded health insurance plans, in accordance with at least one aspect of the present invention.
Figure 6:
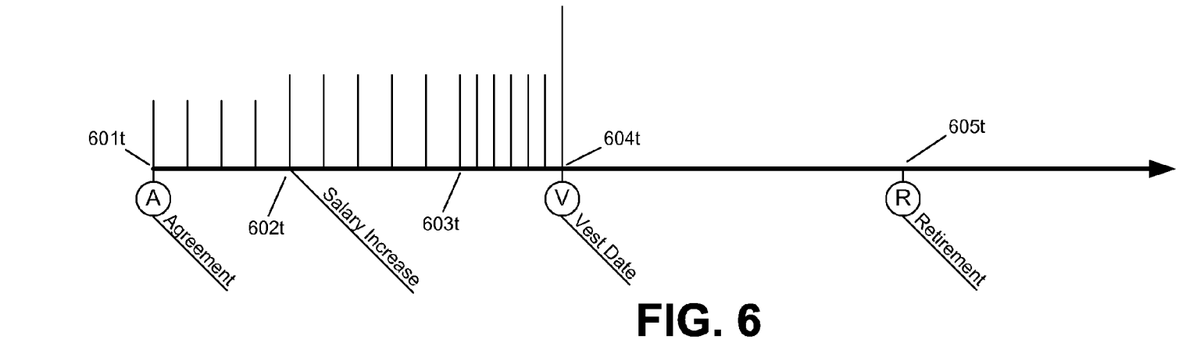
Figure 7:
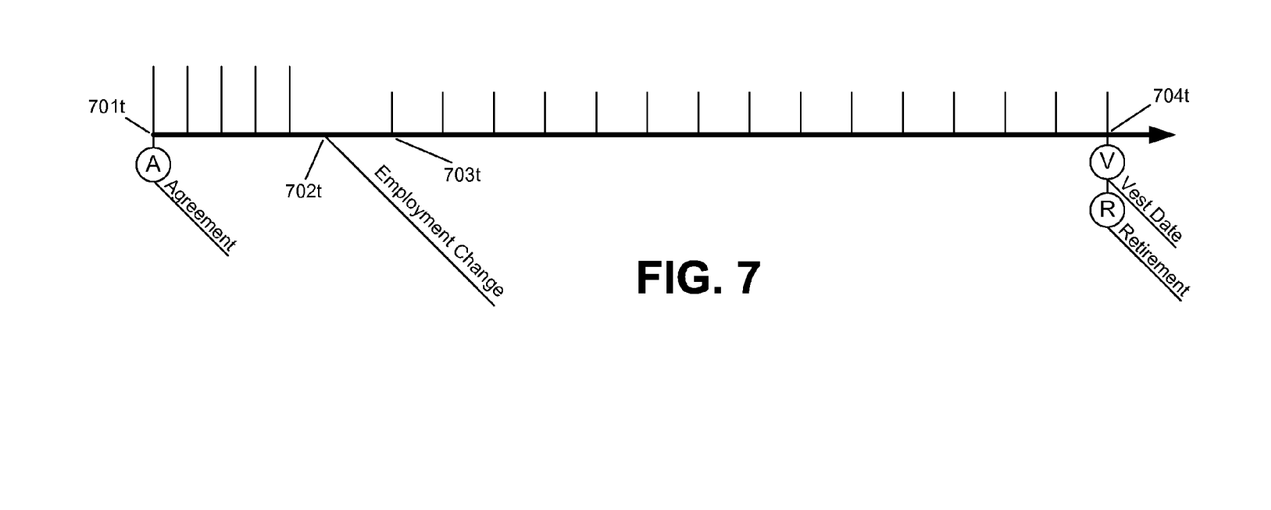

Referring to FIGS. 5-7, three timelines are shown illustrating consumers 210 making payments to an intermediary 220 as part of pre-funded post-retirement health insurance agreements, in accordance with aspects of the present invention. In each of these examples, the timelines are labeled with an agreement date (A), a vest date (V), and a retirement date (R). As discussed above, events affecting the financial position or health considerations of the consumer 210, or other relevant events affecting any of the parties 210-230 may result in changes to these consumers vest dates and retirement dates.

In the example shown in FIG. 5, a consumer-intermediary agreement and an intermediary-provider agreement are made at time 501t. The consumer-intermediary agreement in this example involves a long-term monthly payment of a fixed amount from the consumer 210 to the intermediary 220. The final payment and vest date 502t occur on time according to the initial consumer payment schedule, and the policy becomes active at the designated retirement date 503t. Thus, the example shown in FIG. 5 may correspond to an pre-funded health insurance program initiated through an employee benefit program by a 35-year old employee 210 who paid off the insurance policy according to a 20-year term at age 55, and retired when the policy went into effect at age 60.

Referring now to FIG. 6, this example may correspond to the same employee 210 and initial agreements described above in FIG. 5, where a consumer-intermediary agreement and an intermediary-provider agreement are made at time 601t. However, as shown in FIG. 6, the employee 210 received a salary increase at time 602t, prompting the employee 210 and intermediary 220 to arrange for increased payment amounts over a modified shorter payment term. Then, at time 603t, the employee 210 begins making double payments in order to reduce the payment term even further. Finally, at time 604t, the employee 210 makes a lump sum payment to vest completely the employee's pre-funded insurance policy. Additionally, in this example, the employee 210 requested at time 602t via the intermediary 220 for a change in the retirement date for the insurance policy. Thus, the intermediary-provider agreement has also been modified to move the employee's retirement date up to time 605t. As discussed above, moving the retirement data may result in an additional change to the consumer payment schedule, because the overall policy term has been lengthened.

Referring now to FIG. 7, this example may also correspond to the same employee 210 and initial agreements described above in FIG. 5, where a consumer-intermediary agreement and an intermediary-provider agreement are made at time 701t. However, this example, the employee 210 changed employers at time 702t, causing the employee 210 to miss multiple payments from the initial consumer payment schedule. The employee's pre-payments recommenced at time 703t, but at less frequency and lower amounts, because the employee 210 accepted a lower salary position. Thus, the consumer payment schedule has been modified as appropriate for the employee's new position, and the intermediary-provider agreement may also be modified to move the employee's retirement date back to time 704t. Thus, in this example, the employee's pre-funded health insurance policy will vest concurrently with the employee's retirement. In other examples, a pre-funded insurance policy vest date may even occur after the consumer's retirement date.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

The invention claimed is:

1. A method for providing pre-funded health insurance, the method comprising:
   receiving at a server of a health insurance intermediary applicant information relating to pre-funded health insurance for an applicant;
   identifying an insurance activation date for the applicant;
   determining an applicant payment schedule for a health insurance policy based on the applicant information and the insurance activation date for the applicant;
   identifying a health insurance provider to support the health insurance policy;
   initiating at the server of the health insurance intermediary a first agreement between the applicant and the health insurance intermediary for pre-funded health insurance, the first agreement comprising a responsibility for applicant payments according to the determined payment schedule, wherein according to the determined payment schedule, all applicant payments for the health insurance policy are made prior to the identified insurance activation date; and
   initiating at the server of the health insurance intermediary a second agreement between the health insurance intermediary and the health insurance provider, the second agreement comprising an obligation of the health insurance provider to provide health insurance to the applicant beginning on the insurance activation date for the applicant,
   wherein the applicant payment schedule designates applicant payments over at least 10 years, and wherein the date corresponding to the insurance activation date for the applicant is at least 10 years after the first agreement and second agreement are initiated,
   wherein the first agreement is part of an employment agreement between the applicant and a first employer, the first employer comprising the health insurance intermediary, and wherein according to the first agreement a portion of the applicant payments are paid by the first employer on behalf of the applicant,
   wherein according to the first agreement, after employment between the applicant and the first employer has terminated, the applicant has the option of transferring responsibility for the applicant payments to a second employer or assuming the responsibility for the applicant payments,
   wherein the first agreement permits the applicant to increase the amount of the applicant payments during the term of the first agreement in exchange for shortening the length of the payment schedule, and
   wherein the first agreement permits the applicant to withdraw during the term of the first agreement and receive a return payment based on the sum of applicant payments previously paid, and wherein the processing system cancels the obligations of the health insurance provider with respect to the second agreement in response to a withdrawal of the applicant from the first agreement.

2. The method of claim 1, wherein the second agreement further comprises an obligation of the health insurance intermediary to pay health insurance premiums on behalf of the applicant beginning on the insurance activation date for the applicant.

3. The method of claim 1, wherein the first agreement and the second agreement correspond to portions of a single pre-funded health insurance agreement between the applicant, the health insurance intermediary, and the health insurance provider.

4. The method of claim 1, wherein according to the second agreement, the health insurance to be provided to the applicant is either a standalone comprehensive medical plan or a supplemental medical plan associated with Medicare coverage.

5. A computing device configured to provide pre-funded health insurance to a plurality of consumers, the computing device comprising:
 a processor controlling at least some operations of the computing device; and
 a memory storing computer executable instructions that, when executed by the processor, cause the device to perform a method comprising:
  receiving at the computing device a health insurance request including information associated with a health insurance consumer;
  identifying an insurance activation date for the consumer;
  determining a payment schedule for a health insurance policy based on the information associated with the consumer and the insurance activation date for the consumer;
  identifying a health insurance provider to support the health insurance policy;
  storing in the memory a reference to a first agreement between the consumer and a health insurance intermediary for pre-funded health insurance, the first agreement comprising a responsibility for consumer payments according to the determined payment schedule, wherein according to the determined payment schedule, all consumer payments for the health insurance policy are made prior to the identified insurance activation date; and
  storing in the memory a reference to a second agreement between the health insurance intermediary and the health insurance provider, the second agreement comprising an obligation of the health insurance provider to provide health insurance to the consumer beginning on the insurance activation date for the consumer,
  wherein the payment schedule designates consumer payments over at least 10 years, and wherein the date corresponding to the insurance activation date for the consumer is at least 10 years after the first agreement and second agreement are initiated,
  wherein the first agreement is part of an employment agreement between the consumer and a first employer, the first employer comprising the health insurance intermediary, and wherein according to the first agreement a portion of the consumer payments are paid by the first employer on behalf of the consumer,
  wherein according to the first agreement, after employment between the consumer and the first employer has terminated, the consumer has the option of transferring responsibility for the consumer payments to a second employer or assuming the responsibility for the consumer payments,
  wherein the first agreement permits the consumer to increase the amount of the consumer payments during the term of the first agreement in exchange for shortening the length of the payment schedule, and
  wherein the first agreement permits the consumer to withdraw during the term of the first agreement and receive a return payment based on the sum of consumer payments previously paid, and wherein the processing system cancels the obligations of the health insurance provider with respect to the second agreement in response to a withdrawal of the consumer from the first agreement.

6. The computing device of claim 5, wherein the first agreement and the second agreement correspond to portions of a single pre-funded health insurance agreement between the consumer, the health insurance intermediary, and the health insurance provider.

7. The computing device of claim 5, wherein according to the second agreement, the health insurance to be provided to the consumer is either a standalone comprehensive medical plan or a supplemental medical plan associated with Medicare coverage.

8. One or more non-transitory computer-readable media storing computer-executable instructions which, when executed on a computer system, perform a method for providing pre-funded health insurance to a plurality of consumers, the method comprising:
 receiving at the computer system a health insurance request including information associated with a health insurance consumer;
 identifying an insurance activation date for the consumer;
 determining a payment schedule for a health insurance policy based on the information associated with the consumer and the insurance activation date for the consumer;
 identifying a health insurance provider to support the health insurance policy;
 storing in a memory of the computer system a reference to a first agreement between the consumer and a health insurance intermediary for pre-funded health insurance, the first agreement comprising a responsibility for consumer payments according to the determined payment schedule, wherein according to the determined payment schedule, all consumer payments for the health insurance policy are made prior to the identified insurance activation date; and
 storing in a memory of the computer system a reference to a second agreement between the health insurance intermediary and the health insurance provider, the second agreement comprising an obligation of the health insurance provider to provide health insurance to the consumer beginning on the insurance activation date for the consumer,
 wherein the payment schedule designates consumer payments over at least 10 years, and wherein the date corresponding to the insurance activation date for the consumer is at least 10 years after the first agreement and second agreement are initiated,
 wherein the first agreement is part of an employment agreement between the consumer and a first employer, the first employer comprising the health insurance intermediary, and wherein according to the first agreement a portion of the consumer payments are paid by the first employer on behalf of the consumer,
 wherein according to the first agreement, after employment between the consumer and the first employer has terminated, the consumer has the option of transferring responsibility for the consumer payments to a second employer or assuming the responsibility for the consumer payments, wherein the first agreement permits the consumer to increase the amount of the consumer payments during the term of the first agreement in exchange for shortening the length of the payment schedule, and wherein the first agreement permits the consumer to withdraw during the term of the first agreement and receive a return payment based on the sum of consumer payments previously paid, and wherein the processing system cancels the obligations of the health insurance provider with respect to the second agreement in response to a withdrawal of the consumer from the first agreement.

9. The computer-readable media of claim 8, wherein the first agreement and the second agreement correspond to portions of a single pre-funded health insurance agreement between the consumer, the health insurance intermediary, and the health insurance provider.

* * * * *